United States Patent

Burroughs et al.

[11] Patent Number: 5,878,411
[45] Date of Patent: Mar. 2, 1999

[54] DEPENDENT OBJECT CLASS AND SUBCLASS MAPPING TO RELATIONAL DATA STORE

[75] Inventors: Tracy Kim Burroughs, Byron; Wilson D. Lee; Cynthia Ann Rogers, both of Rochester; Laura Jane Zaborowski, Winona, all of Minn.

[73] Assignee: International Business Machines Corporation, Armonk, N.Y.

[21] Appl. No.: 883,838

[22] Filed: Jun. 27, 1997

[51] Int. Cl.⁶ ................................................ G06F 17/30
[52] U.S. Cl. .............................. 707/4; 707/102; 707/103; 707/104
[58] Field of Search ............................... 707/4, 102, 103, 707/104

[56] References Cited

U.S. PATENT DOCUMENTS

| 5,212,787 | 5/1993 | Baker et al. | 707/103 |
|---|---|---|---|
| 5,295,256 | 3/1994 | Bapat | 707/3 |
| 5,426,780 | 6/1995 | Gerull et al. | 707/3 |
| 5,499,371 | 3/1996 | Henninger et al. | 707/102 |
| 5,555,403 | 9/1996 | Cambot et al. | 707/4 |
| 5,613,099 | 3/1997 | Erickson et al. | 395/500 |
| 5,615,362 | 3/1997 | Jensen et al. | 707/103 |
| 5,797,137 | 8/1998 | Golshani et al. | 707/4 |
| 5,799,309 | 8/1989 | Srinivasan | 707/102 |

OTHER PUBLICATIONS

Objectstore DBconnect, ObjectStore Database for the Web http://www.odi.com/products/apc/ap_connect.thml, pp. 1–5, Mar. 24, 1997.
Welcome to O₂ Technology Database Solutions For Object Developers, http://www.02tech.fr, pp. 1–2, Mar. 24, 1997.
Enabling the Integration of Object Applications with Relational Databases, by Arthur Keller, Ph.D., Richard Jensen, and Shailesh Agrawal, Ph.D., Persistence Software, Mar. 24, 1997 Inc.,www.persistence.com/pest . . . ce/pagetwo.pages/technoview.html,pp. 1–9.
Java Relational Binding Delivers Transparent Java Access to Relational Databases, http://www.02tech.com,O₂ Technology, Oct. 7, 1996.
XDB's Jet Series (Java Enterprise Tools), XDB Systems, http:/www.xdb,com/jet, Mar. 24, 1997.
Jetstore, XDB Systems, http://www.xdb.com/jet/store, pp. 1, Mar. 24, 1997.
Jetassist Instant Database Applet Development for Java, XDB Systems, http://www.xdb.com/jet/assist, pp. 1–2, Mar. 24, 1997.
Jetconnect Universal Database Access for Java, XDB Systems, http://www.xdb.com/jet/connect, pp. 1–2, Mar. 24, 1997.

*Primary Examiner*—Paul V. Kulik
*Assistant Examiner*—Jean R. Homere
*Attorney, Agent, or Firm*—Lawrence D. Maxwell

[57] ABSTRACT

A method and system for mapping a persistent dependent object between object-oriented schema and relational data store schema. Prior to application program run-time, schema mapping code is generated that defines a logical combination of null and non-null columns in the relational tables for each dependent class and dependent subclass. The code maps each instance variable of each class and subclass of the dependent to one column of the relational data store schema. The code maps a null value to each column for which a dependent subclass has no corresponding instance variable. At run-time, an application program may invoke the services of a schema map object, which in turn calls an object database driver such as ODBC to store an object in the data store or retrieve an object from the data store. In response to such calls referencing an object, the object database driver accesses the data store and associates the data elements with instance variables of the object in accordance with the mapping defined by the mapping code. The subclasses of the dependent are determined by comparing the pattern or combination of null values and non-null values read from the columns corresponding to each class and subclasses to that which the mapping code defines for each class and subclass. The application program, having been provided with the class and subclasses of the dependent, may then store the (non-null) values read by the driver into the instance variables of the object.

13 Claims, 6 Drawing Sheets

Microfiche Appendix Included
(1 Microfiche, 24 Pages)

DEPENDENT OBJECT CLASS AND SUBCLASS MAPPING TO RELATIONAL DATA STORE

A Microfiche Appendix consisting of one microfiche, 24 frames, is included in this disclosure. A portion of this disclosure contains material that is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND OF THE INVENTION

1. Field of the Invention

The present invention relates generally to object-oriented computing and relational data store systems and, more specifically, to mapping dependent objects between object schema and relational schema.

2. Description of the Related Art

Businesses commonly need to store and access large quantities of data relating to specific business matters, such as their financial accounts, inventory, customers, employees, and other matters. Businesses use computers, of course, to aid this task. Businesses have invested billions of dollars in computer systems that store and access such business data. To minimize losses on this investment in computer systems, an important consideration in introducing new computer technology is adapting it to interface with existing computer technology.

A database is a structure in which a computer system may store a large quantity of data organized in a manner that facilitates efficient storage, search and retrieval. Physically, at the heart of any database is some suitable type of data store, such as magnetic disks, on which data may be recorded. Nevertheless, computer scientists and other researchers have developed a number of different conceptual models under which databases may be constructed.

The most prevalent database model is known as a relational database. In a relational database the data are organized in tables, also referred to as relations. Each data element in a table is indexed by its row and column in the table. Each row, also known as a tuple, represents an entity that is useful or meaningful to the business or other database user, and each column in that row refers to a data element that defines a characteristic or attribute of that entity. For example, each row in a company's database of its employees may refer to a certain employee. One column may refer to an employee's name, another column to an employee's identification number, and another column to an employee's address. Certain columns may be designated as "keys" to uniquely identify each row. For example, the column referring to an employee's name may be defined as a key. Keys may include primary keys, which are used as the primary means to access the rows, and foreign keys, which are used to define links between tables. The programmer who creates the database has considerable latitude in specifying the rows, columns, keys, and other characteristics that define the schema of a relational database.

The above-described data model underlying relational databases was developed to facilitate the storage and retrieval of data under the control of programming languages of the type that were prevalent at the time, which were primarily those known as procedural or structured programming languages. Because procedural programming languages and relational databases were for many years being developed and improved upon contemporaneously with one another, procedural languages are, not surprisingly, well-suited to manipulating relational database data. For example, a feature of most procedural programming languages allows a programmer to access an element of a table by specifying its row and column. Although a program would not necessarily access a database element using that feature of the programming language, the point to note is that relational schema and procedural programming share common concepts and programming philosophies.

Another type of programming, known as object-oriented programming (OOP), is becoming increasingly popular and may eventually supplant procedural programming. A potential problem, however, is that OOP languages do not inherently interface smoothly with relational databases. For example, the concept of indexing a table of data elements by row and column is in itself somewhat at odds with the OOP philosophy of handling an object in accordance with what it represents rather than how it is represented in a rigid data structure.

The goal of OOP is to reduce the time and costs associated with developing complex software by creating small, reusable sections of program code that can be quickly and easily combined and re-used to create new programs. The code sections are known as objects. OOP languages, such as Smalltalk, C++, and Java, have been developed that allow programmers to approach their programming tasks in a way that is believed to be more natural and intuitive than that in which programmers traditionally approached tasks armed with only the tools of procedural programming languages. Using the unique tools or features of an OOP language, which are described below in further detail, a programmer can write code to define a software object that models something in the real world. The software object may model the attributes or characteristics of the real-world object and, in many cases, may also model its behavior. For example, a programmer whose task it is to create an employee database program can create an object that models an employee. An employee object may have certain attributes of a real employee, such as a name, an address, an employee number, and so forth. Exploiting the full capabilities of OOP, a programmer could use the employee object in a program in a manner that roughly corresponds to the way one would interact with a real employee. For example, the programmer could define the employee object to provide its address when the object is asked for that information or to provide its status, such as "on vacation," when asked for status information. It should be noted that access element of a table by specifying a row and column is a concept foreign to object-oriented programmers and not in keeping with the OOP philosophy of modeling things in the real world in a natural, intuitive manner.

Object-oriented databases (OODBs) that are specifically designed to facilitate storage and retrieval of objects have been developed. Objects that are stored in a data store are known as persistent objects because they "persist" after the program that created them ceases executing.

Despite the recent development of dedicated OODBs, businesses have invested billions of dollars over the years in their existing or legacy relational databases. It would be an extraordinarily uneconomical task to transfer all legacy relational data into OODBs. Furthermore, relational databases are continuing to be developed and improved and remain widely commercially available. Therefore, software has been developed that interfaces object-oriented software to relational databases. Such software typically includes a development tool that allows a database programmer to map the object schema to the relational schema. The software also typically includes a call-level interface. The call-level interface acts as a translator between an object-oriented application program and a relational database. Thus, although the objects are ultimately stored in relational format, the storage format is transparent to the application program, which may access them in the same manner as it would a persistent object in a dedicated OODB. An example of such software is described in U.S. Pat. No. 5,629,979, titled "A SYSTEM AND METHOD FOR PROVIDING A GRAPHICAL USER INTERFACE FOR MAPPING AND ACCESSING OBJECTS IN DATA STORES," (IBM Docket ST9-94-017) incorporated herein by reference, and its related U.S. patent application Ser. No. 08/276,382, filed Jul. 18, 1994, titled "A SYSTEM AND METHOD FOR MAPPING AND ACCESSING OBJECTS IN DATA STORES" (IBM Docket ST9-94-016).

Although OOP concepts are described in further detail below, a concept that relates to the present invention is that objects may be contained or encapsulated within other objects. This concept is commonly known as aggregation or containment by value. The contained object may be referred to as a dependent. Mapping dependents between object schema and relational schema presents several problems that are not presented in mapping ordinary objects. The problems are generally related to the concept that, unlike ordinary objects, dependents may not have their own unique identity or "handle" by which the programmer can reference them. These problems are satisfied by the present invention in the manner described below.

SUMMARY OF THE INVENTION

The present invention relates to a method and system for mapping a dependent between object-oriented schema and relational data store schema. A dependent, as defined in this patent specification, is an object that is contained (by value, as opposed to by reference) within another object, and that an application program cannot reference directly but rather can only reference indirectly by referencing the object containing the dependent. The problem that the invention addresses is that, unlike an ordinary object or entity, no handles or other references to the subclasses of a dependent object are stored in the data store. Thus, a programmer cannot readily determine the subclasses to which a dependent belongs. In general, a program cannot access the data store to restore the values of all the instance variables of an object, a process known as fluffing, unless it can determine the subclasses to which the dependent belongs. The present invention addresses this problem by defining for each dependent class and dependent subclass a pattern of predetermined marker values in columns of one or more tables in the data store that uniquely identifies that dependent class or subclass and differentiates it from other dependent classes and subclasses. The markers may be, for example, null characters. Null characters in certain columns and not in others define a pattern.

Prior to the time an application program is run, schema mapping code is generated that defines the mapping in a suitable high-level schema mapping language. The schema mapping code may be generated by a programmer either manually or with the aid of a schema mapper tool. The code maps each instance variable of each class and subclass of the dependent to one column of the relational data store schema. The code maps a null value to each column for which a dependent subclass has no corresponding instance variable.

At run-time, an application program may invoke the services of an object database driver to, for example, store an object in the data store or retrieve an object from the data store. In response to such calls referencing an object, the object database driver accesses the data store and associates the data elements with instance variables of the object in accordance with the mapping defined by the mapping code. The driver may be a conventional or commercially available object database driver because the mapping is transparent to it. In a case in which the access requests the driver to retrieve an object from the data store, the driver reads the locations in the data store that correspond to the attributes of all class and subclasses of the dependent. The subclasses of the dependent are determined by reading from the data store the values of the columns corresponding to each class and subclasses, and comparing the pattern of columns having markers and columns not having markers that which the mapping code defines for each class and subclass. The application program, having been provided with the class and subclasses of the dependent, may then fluff the object having the dependent, i.e., may restore the instance variables of the object, including those of its dependent, with the values read by the driver.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF PREFERRED EMBODIMENTS

Figure 1:
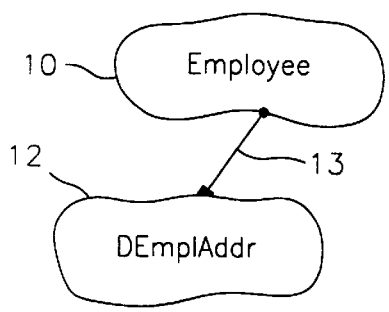
FIG. 1 illustrates an exemplary class and its dependent.

The present invention relates to a method and system for mapping a dependent object between object-oriented schema and relational data store schema. An Overview section is provided below for the benefit of readers who are not generally familiar with the dependent mapping problem that the present invention addresses. Readers who are skilled in the art of OOP technology and understand the concept of dependents may wish to skip the Overview section and proceed directly to the Detailed Description section of this specification.

1. Overview

OOP differs from standard procedural programming in that it uses objects rather than procedures as the fundamental building blocks for creating computer programs. Both objects and procedures are embodied as sections of code that may be written in a high-level language. Nevertheless, how a programmer uses objects to design programs differs greatly from how a programmer uses procedures. Both OOP and procedural programming have as a goal to break a programming task into smaller, more manageable sub-tasks. Although a procedural programmer may break a program into a hierarchy of procedures, each of which performs an algorithm, the procedures are generally not autonomous. Thus, although a procedure lower in the hierarchy potentially could be re-used in a different program by a different procedure higher in the hierarchy, such re-use of code is not nearly as straightforward or intuitive as the re-use of objects.

A fundamental concept in OOP is the class. A class is a template or prototype that defines a type of object. A programmer may define a class by writing a section of code known as a class definition. An object is an instance of a class. An object is created or instantiated at run-time, i.e., when the computer executes a statement in the program calling for the instantiation of an object of a specified class. An object may include attributes or data as well as functions or methods. The class definition specifies the attributes and methods. The attributes are represented in an object by the values of instance variables.

Another important concept of OOP is encapsulation. Often, an object may perform its function without needing to reveal its implementation or internal data. A class definition may specify that the data of objects of that class is private and cannot be retrieved by another object. Objects must communicate with one another via their object interfaces, and the data may be encapsulated by limiting access to it through the object interface. Such data can only be modified by the object methods.

Another important concept of OOP is inheritance. Inheritance is the ability to derive a new class from one or more existing classes. The new class, known as a subclass, may inherit or incorporate all properties of a base class, including its attributes and its methods. The new class or subclass may be defined to include additional properties.

Objects communicate with one another by sending and receiving messages. A powerful concept of OOP, known as polymorphism, is that objects of different classes may respond to the same message in different ways.

Encapsulation, inheritance and polymorphism are three important concepts that differentiate OOP from procedural programming. Another concept that is featured in many OOP languages is known as aggregation or containment by value. A dependent is a type of aggregation. A dependent object differs from other types of objects in that it is not shared. Rather, a dependent object is contained within another object, which may be referred to as an entity to distinguish it from dependents and other classes of objects.

A framework is a collection of base classes that extends the power of object-oriented systems. Stated another way, a framework is a set of cooperating classes that make up a reusable, extensible architecture. A framework functions as the operating environment. A programmer can use the base classes to derive more specialized classes that represent business objects or entities.

A persistent object can be preserved beyond the termination of the process that created that object. A framework that supports persistent objects includes methods that allow persistent objects to be stored in and retrieved from a non-volatile data store, such as a magnetic disk or writeable optical disk. In the environment of a preferred framework, the dependent objects referred to in this specification are only persistent when contained in an entity. That entity "owns" the dependent. The life cycle of a persistent dependent object does not exceed that of its containing entity. When the containing entity is deleted, all of its contained dependent objects are deleted.

Figure 2:
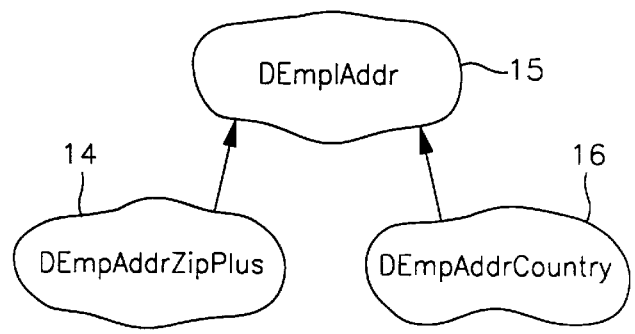
FIG. 2 illustrates an exemplary class hierarchy.

As illustrated in FIGS. 1 and 2, the invention is described below with regard to an exemplary entity 10 of a class "Employee" and its dependent 12. The conceptual connection 13 between them is intended to indicate that dependent 12 is contained by value in entity 10. Dependent 12 is of a class 15, "DEmplAddr", which may be of one of two subclasses 14 and 16, "DEmpAddrZipPlus" and "DEmpAddrCountry", respectively. (Under the naming conventions used in this specification, the names of dependent classes begin with an uppercase "D".)

The choice of whether to make a class a dependent class or an independent class provides a programmer with flexibility. On one hand, an entity (i.e., an object of an independent class) maximizes subclassing flexibility for the programmer. On the other hand, an entity may degrade system performance somewhat due to the system overhead involved. Some system overhead is incurred in obtaining the handle. Other system overhead is incurred in fluffing the entity. A dependent is instantiated and fluffed when its containing entity is instantiated and fluffed. If the same object were designated by the programmer as an entity rather than a dependent, it would not be instantiated and fluffed until its handle was referenced during program execution, a process sometimes known as lazy instantiation. Because programmers are familiar with such performance/flexibility tradeoffs, such considerations are not discussed further in this specification.

The problem is that dependent objects, unlike entities, do not have unique identities by which an application program may reference them when it attempts to retrieve them from a data store. For example, an application program cannot readily restore the instance variables of dependent 12 because the application program cannot readily determine whether dependent 12 is of subclass 14 or of subclass 16. The present invention includes, among other aspects, a method for determining the subclass of a dependent.

2. Detailed Description

Figure 3:
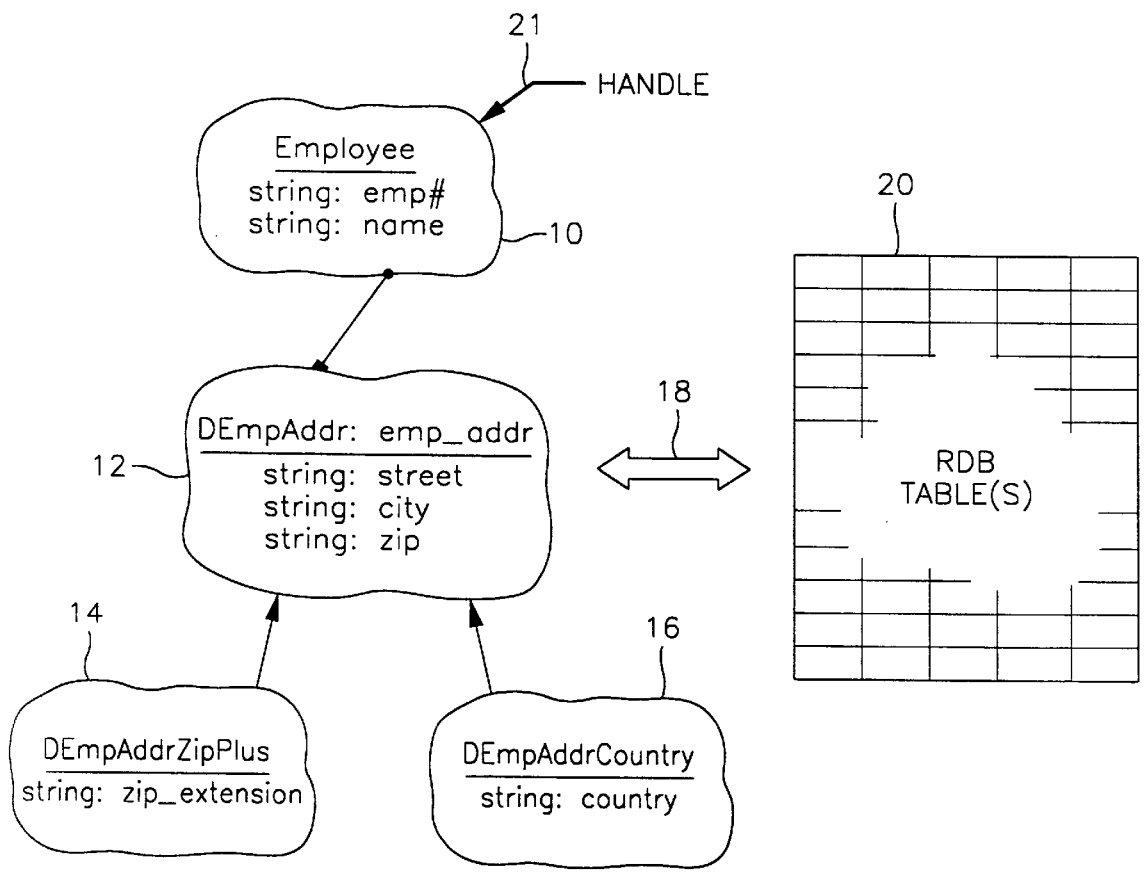
FIG. 3 illustrates mapping dependent classes and subclasses between object schema and relational schema.

As illustrated in FIG. 3, entity 10 has an employee number attribute, represented by an instance variable "emp#", and an employee name attribute, represented by an instance variable "name". Dependent 12 has a street address attribute, represented by an instance variable "street", an city attribute represented by an instance variable "city", and a zip code attribute represented by an instance variable "zip". The dependent class "DEmpAddr" has two dependent subclasses 14 and 16. Subclass 14, "DEmpAddrZipPlus", defines a zip code extension attribute "zip_extension". Subclass 16, "DEmpAddrCountry", defines a country attribute "country".

In this example, the "Employee" class, including dependent 12, is intended to model the type of employee information that would be useful in an application program that maintains a company's employee database. Subclasses 14 and 16 are included to offer flexibility. As residents of the United States know, a zip code is a five digit code that identifies a certain geographic area of the country to facilitate mail delivery. Zip codes may have a four digit zip code extension. Nevertheless, the object structure in this example illustrates an application programmer's recognition that certain employees may live outside the United States and have no zip code extension. The information relating to still other employees may have neither a zip code extension nor a country. Thus, for a given employee, the program may store and retrieve the employee's number, name, street, city, and postal code, and may further store and retrieve the employee's zip extension or the employee's country. Whether dependent 12 is of subclass 14 or subclass 16 or neither was determined at the time dependent 12 was instantiated in accordance with the application program (not shown). For purposes of describing the present invention, application program details are of little relevance. The application program may be written in any suitable OOP language, such as C++ or, more preferably, Java. For purposes of the present invention, it is sufficient to note that the application program should define the classes and their instance variables, such as those described in the example above. In this example, the instance variables are declared as type "string" for purposes of illustration.

The present invention relates to the mapping, illustrated conceptually by the arrow 18, of persistent objects and their dependents between object schema, such as that in the above-described example, and relational database schema 20. Relational database schema 20 is generally defined by one or more tables. The present invention maps entity 10, including its dependent 12, to one or more of those tables in a manner that allows the OOP system to retrieve the stored data and use it to restore or fluff entity 10 in accordance with the proper subclass of its dependent 12.

It is known in the art that an application program may invoke the services of database connectivity driver to store objects in and retrieve objects from a relational data store. The open database connectivity (ODBC) driver, developed by Microsoft Corporation of Redmond, Wash., is one such driver that interfaces object-oriented application programs and relational databases. The Java™ database connectivity (JDBC™) driver, developed by Sun Microsystems of Mountain View, Calif., is used in a Java environment to interface object-oriented Java™ application programs and relational databases. In keeping with the OOP environment, the application program interfaces are themselves objects whose methods store and retrieve data from the data store. To fluff an object with data retrieved from the data store, an application program must reference the object and its instance variables. It should be noted that a system can readily fluff an ordinary entity (i.e., an entity not having dependents) because the entity has a handle that references the entity. The term "handle" refers to an object that references the entity. A handle, which may also referred to in the art as an "object reference," includes information describing the entity's class and subclass(es) as well as an identifier such as a primary key or a universally unique identifier (UUID). In the example, a handle 21 references entity 10. Nevertheless, the existence of dependent 12 creates a potential problem that is solved by the present invention in the manner described below.

Figure 4:
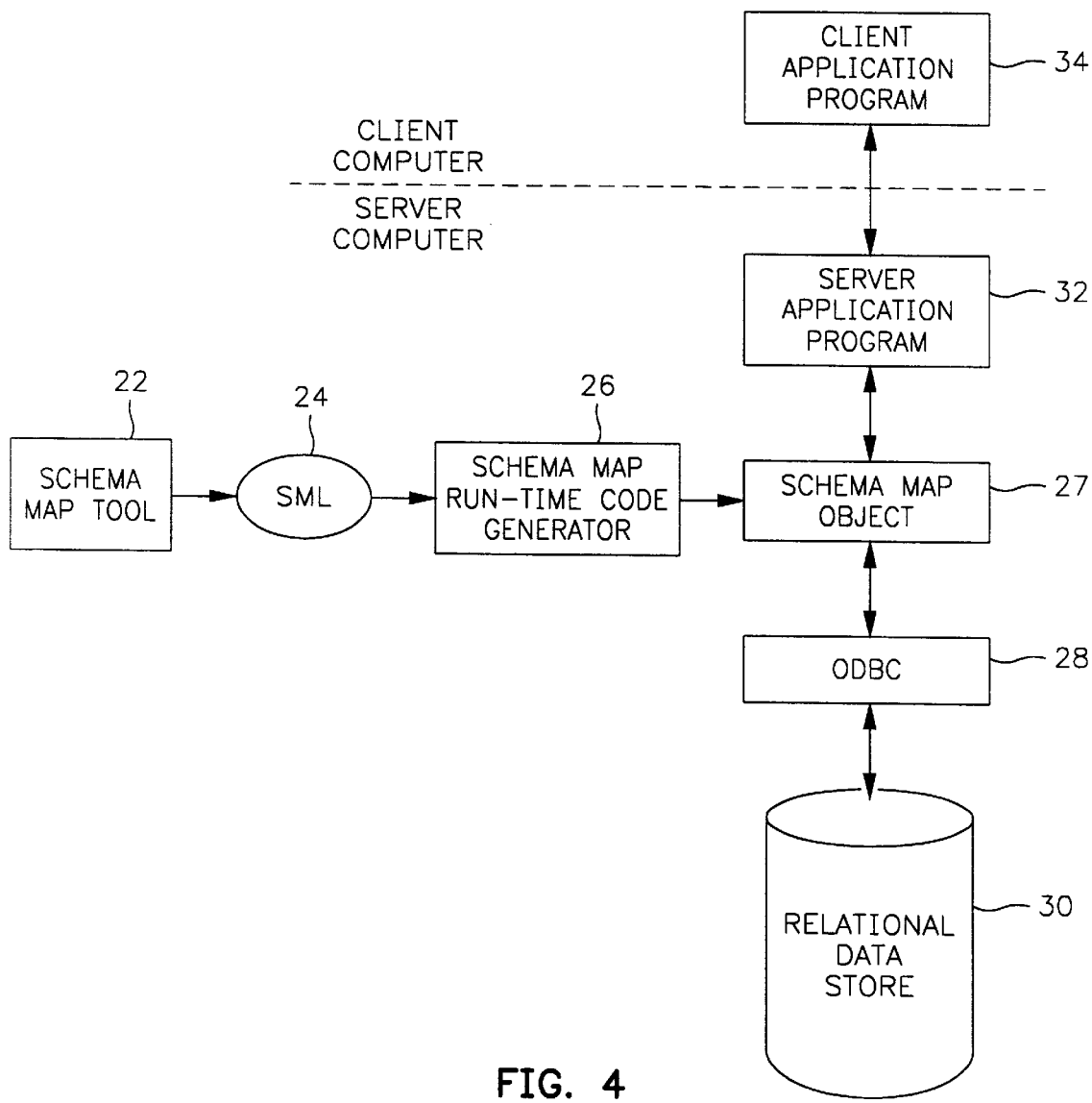
FIG. 4 illustrates a client-server computer system having a relational data store in which the method of the present invention maps between the relational schema of the data store and the object schema of the run-time environment.

As illustrated in FIG. 4, a user may use a schema map tool 22 to generate schema mapping language (SML) 24. Alternatively, the user may write SML 24 manually. Schema map tool 22 allows the user to define object classes and relational tables and generate a mapping between them. Mapping between object schema and relational schema is described in, for example, U.S. Patent No. 5,629,979, titled "A SYSTEM AND METHOD FOR PROVIDING A GRAPHICAL USER INTERFACE FOR MAPPING AND ACCESSING OBJECTS IN DATA STORES," (IBM Docket ST9-94-017) incorporated herein by reference, and its related U.S. patent application Serial No. 08/276,382, filed Jul. 18, 1994, titled "A SYSTEM AND METHOD FOR MAPPING AND ACCESSING OBJECTS IN DATA STORES" (IBM Docket ST9-94-016). Because such mapping systems are known, the full capabilities and features of schema map tool 22 and the SML 24 it generates are not discussed in the present specification. It is sufficient to note that schema map tool 22 and SML 24 have the features described below with respect to an exemplary embodiment of the present invention. Schema map tool 22 and SML 24 may have any other suitable features, such as those described in the above-referenced patent specifications. Although schema map tool 22 and SML 24 may have such features, for purposes of clarity the description in the present specification focuses on those features that relate to the dependent mapping method of the present invention.

A schema map run-time code generator 26 parses SML 24 and links it with the entities defined in an application program to produce executable or run-time mapping code. A suitable schema map run-time code generator 26 is described in the above-referenced U.S. patent documents. The run-time mapping code is stored in a schema map object 27 and interfaces to ODBC driver 28, which is commercially available from a number of sources. A JDBC driver would also be suitable. The above-referenced U.S. patent documents describe such an interface and the use of a schema map object in further detail. ODBC driver 28 functions as a call-level interface to a relational data store 30. The ODBC application program interface (API) defines classes that represent database connections, standard query language (SQL) statements, result sets, database metadata, and so forth. Although not shown, the software preferably further includes a suitable object framework that provides a set of base classes from which a programmer may derive the classes used in the application program.

Although the present invention may be embodied in a non-networked computing system, it is more preferably embodied in a client-server computing system. The application program is distributed between a server application program 32 and a client application program 34 in any suitable manner that is conventional in client-server computing. In a similar vein, although schema map tool 22 is illustrated as part of the server computer, a user may use schema map 22 remotely from any suitable computer networked to the server computer. Essentially, the functional elements of the present invention may be distributed among any suitable computing systems that are networked to one another.

Figure 5:
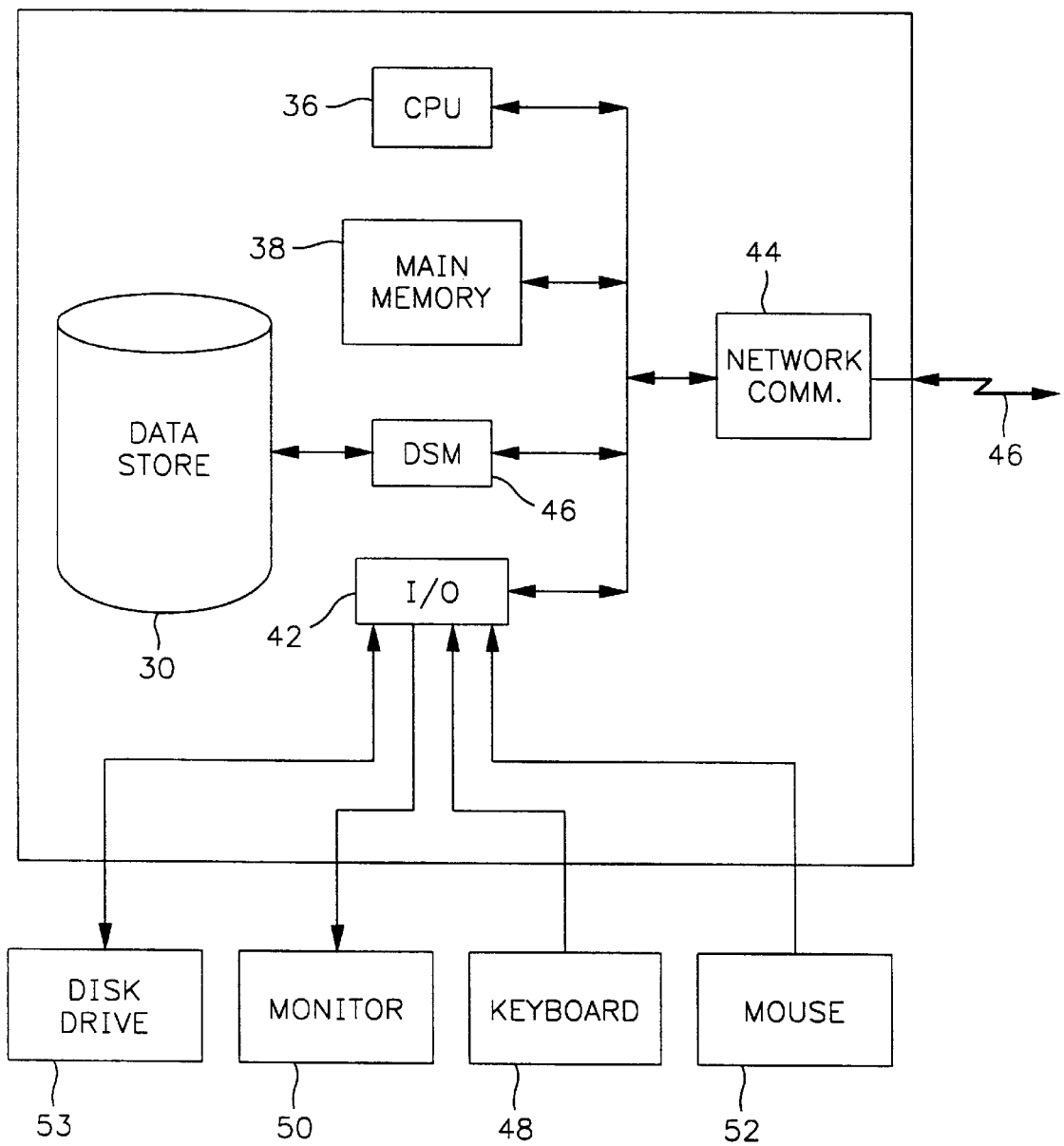
FIG. 5 illustrates a programmed computer for performing the methods of the present invention.

A suitable server computer is illustrated in FIG. 5 and may be programmed in any suitable manner that effects the functions described herein. The computer includes a central processing unit 36, a main memory 38, a data store manager 40, input/output (I/O) interfaces 42, and network communication interfaces 44. A network communication link 46 connects the computer to other computers, such as the client computer (not shown). A user may interact with schema map tool 22 via a keyboard 48, monitor 50 and a mouse 52. A removable-media disk drive 53, such as a floppy disk drive, is also provided, and may be used for, among other purposes, recording SML 24 or schema object 27. Although data store 30 is illustrated as being integral to the server computer for purposes of clarity and convenience, it may be remotely located and accessed via network communication link 46. Similarly, SML 24 or schema map object 27 may be transmitted to or received from remote computers via network communication link 46.

The application program used in the example described in this specification relates to a company's employee database. The application program treats the employee entity described above with respect to FIG. 3 as a persistent object that may be stored in and retrieved from data store 30. Schema map run-time code generator 26 links the employee entity with schema map object 27 such that when the application program references the employee entity by its handle 21, schema map object 27 produces the proper calls to ODBC 28. ODBC 28 retrieves the data into a buffer, which server application program 32 can read to fluff the employee entity.

The example described above with respect to FIG. 3 relates to an application program in which the following classes and subclasses are defined. The following exemplary code is written in Java™:

```
Class Employee {
    String emp#;
    String name;
    DEmpAddr emp_addr;
}
Class DEmpAddr {
    String street;
    String city;
    String zip;
}
Class DEmpAddrZipPlus extends DEmpAddr {
    String zip_extension;
}
Class DEmpAddrCountry extends DEmpAddr {
    String country;
}
Class DEmpKey {
    String emp#;
}
```

Figure 6:
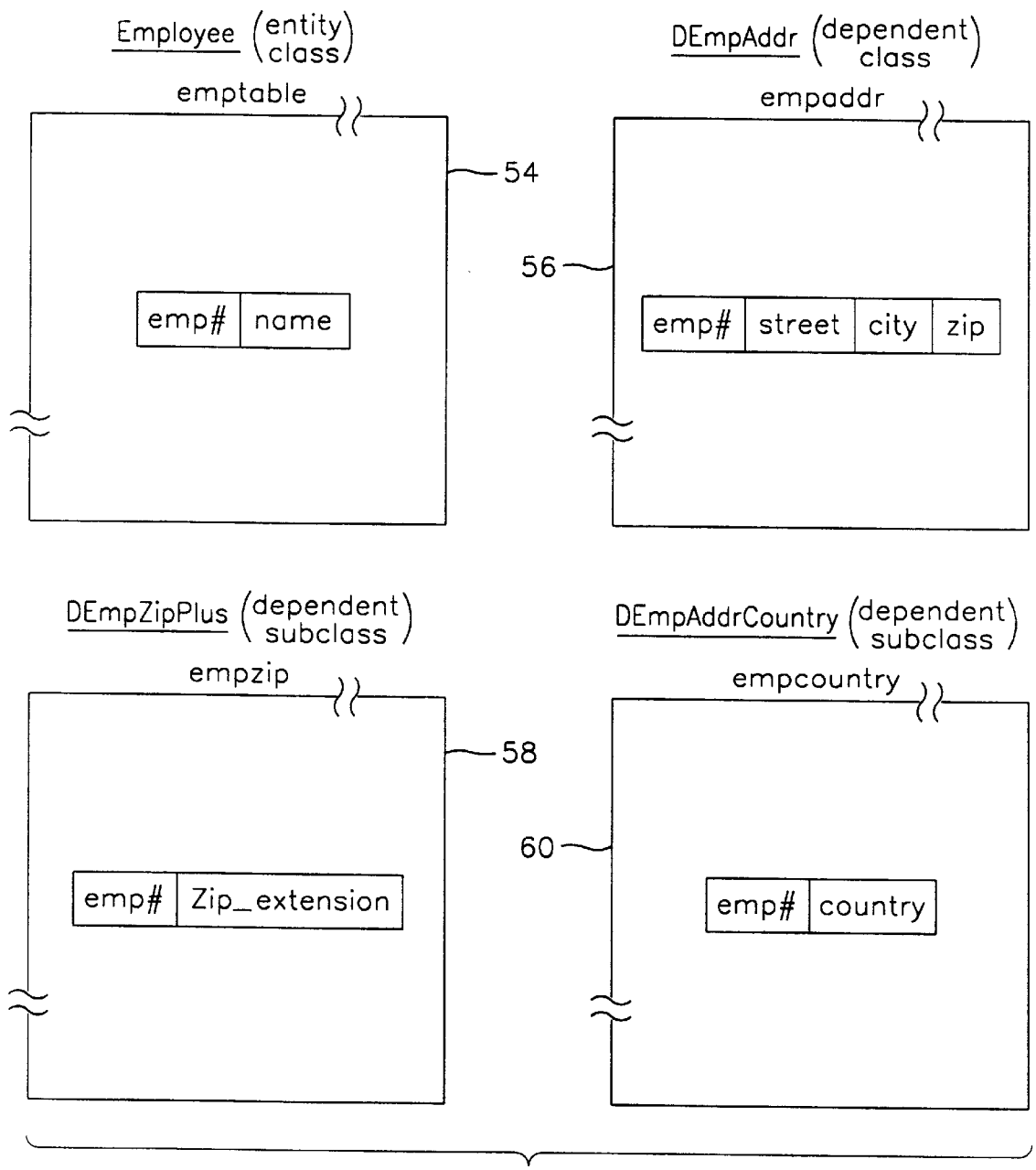
FIG. 6 illustrates a mapping method in which dependent classes and subclasses are mapped to tables separate from that to which the entity containing the dependent is mapped.

FIG. 6 illustrates a mapping method that can be performed at run-time to determine whether dependent 12 (see FIG. 1) is of subclass 14, subclass 16 or neither. A user generates the SML 24, either manually or using schema map tool 22, that defines the mapping. In accordance with this method, the data relating to classes and subclasses of the employee entity are stored in different tables. A table "emptable" 54, which relates to the "Employee" entity class is defined that stores the value of instance variable "emp#" and instance variable "name". Another table "empaddr" 56, which relates to the "DEmpAddr" dependent class, is defined that stores the value of instance variables "emp#", "street", "city", and "zip". Yet another table "empzip" 58, which relates to the "DEmpZipPlus" dependent subclass, is defined that stores the value of instance variables "emp#" and "zip_extension". Still another table "empcountry" 60, which relates to the "DEmpAddrCountry" dependent subclass, is defined that stores the value of instance variables "emp#" and "country".

The following is a code listing of the SML 24 that defines the above-described mapping between relational tables and object schema. Although the code may be immediately understood by many persons skilled in the art because the language is similar to SQL, further information is provided in the form of syntax diagrams, explanatory remarks and further examples in an Appendix to this specification. Other schema mapping languages may also be suitable.

```
CLASS Account.Employee
    PRIMARYKEY Account.DEmpKey
        PRIMARY_KEYFIELD Emp# String FIELD emp#
    END_PRIMARYKEY
    FIELD emp# String COLUMN emptable.emp# CHAR(6) EXTERNAL
            NOTNULL
    FIELD name String COLUMN emptable.name VARCHAR(20) EXTERNAL
    OBJECT emp_addr DEmpAddr
        CLASSKEYMAP (CLASSIS Account.DEmpAddr
            WHEN empzip.zip_extension CHAR(9) EXTERNAL = NULL,
                empcountry.country VARCHAR(20) EXTERNAL = NULL)
        CLASSKEYMAP (CLASSIS Account.DEmpAddrZipPlus
            WHEN empzip.zip_extension CHAR(9) EXTERNAL ^= NULL,
                empcountry.country VARCHAR(20) EXTERNAL = NULL)
        CLASSKEYMAP (CLASSIS Account.DEmpAddrCountry
            WHEN empzip.zip_extension CHAR(9) EXTERNAL = NULL,
                empcountry.country VARCHAR(20) EXTERNAL ^= NULL)
        FIELD street String COLUMN empaddr.street VARCHAR(30)
                EXTERNAL
        FIELD city String COLUMN empaddr.city VARCHAR(15) EXTERNAL
        FIELD zip String COLUMN empaddr.zip VARCHAR(9) EXTERNAL
        SUBCLASS DEmpAddrZipPlus
            FIELD zip_extension String COLUMN empzip.zip.extension CHAR(4)
                    EXTERNAL
        END_SUBCLASS
        SUBCLASS DEmpAddrCountry
            FIELD country String COLUMN empcountry.country VARCHAR (20)
                    EXTERNAL
        END_SUBCLASS
        COLUMN empaddr.emp# CHAR(6) EXTERNAL NOTNULL
        COLUMN empzip.emp# CHAR(6) EXTERNAL NOTNULL
        COLUMN empcountry.emp# CHAR(6) EXTERNAL NOTNULL
    END_OBJECT emp_addr
    RELATIONSHIP emptable.emp# JOINTABLE empaddr.emp# JOINTYPE
            INNER
    RELATIONSHIP empaddr.emp# JOINTABLE empzip.emp# JOINTYPE
            INNER
    RELATIONSHIP empaddr.emp# JOINTABLE empcountry.emp# JOINTYPE
            INNER
END_CLASS Account.Employee
```

The above-listed SML code defines a class "Employee" in a directory "Account". The class is defined to have a dependent "emp_addr".

Using the tag PRIMARY_KEYFIELD, the employee number instance variable "emp#" is designated as the primary keyfield of the relational schema. If the relational schema relates to legacy or existing data, it will already have one or more primary keyfields, and the user must designate them.

With reference to FIGS. 3 and 6, using the tag FIELD, the employee number instance variable "emp#" is mapped to a column "emp#" in the table "emptable" 54. Similarly, the employee name instance variable "name" is mapped to a column "name" in the table "emptable" 54.

The SML code maps the dependent object of class "DEmpAddr" having the name "emp_addr", as defined in the Java™ class definitions above. Using the tags "CLASSKEYMAP" and "CLASSIS...WHEN", the code states that: the subclass is "DEmpAddr" when a null value is stored in the "zip_extension" column of table "empzip" 58 and a null value is stored in the "country" column of table "empcountry" 60; the subclass is "DEmpAddrZipPlus" when a non-null value (the symbol "^=" means "not equal to") is stored in the "zip extension" column of table "empzip" 58 and a null value is stored in the "country" column of table "empcountry" 60; and the subclass is "DEmpAddrCountry" when a null value is stored in the "zip_extension" column of table "empzip" 58 and a non-null value is stored in the "country" column of table "empcountry" 60.

With reference again to FIGS. 3 and 6, the SML code further maps the instance variables of dependent 12 that do not exist in entity 10. Using the tag FIELD, the street address instance variable "street" is mapped to a column "street" in the table "empaddr" 56. Similarly, the city instance variable "city" is mapped to a column "city" in the table "empaddr" 56. Also, the zip instance variable "zip" is mapped to a "zip" column in the table "empaddr" 56.

The SML code defines the two subclasses, "DEmpAddrZipPlus" and "DEmpAddrCountry". The zip extension instance variable "zip_extension" of the former class is mapped to a column "zip-extension" in the table "empzip" 58. The country instance variable "country" of the latter class is mapped to a column "country" in the table "empcountry" 60.

The SML code uses the "RELATIONSHIP" tag to join the "emp#" columns of tables 54, 56, 58 and 60 using a foreign key relationship. The "COLUMN" tag is necessary to describe the columns used by the "RELATIONSHIP" tag.

In operation, when the application program references an "Employee" entity via its handle 21, the run-time code that resides in schema map object 27 issues the appropriate calls to ODBC 28. In response, ODBC 28 retrieves the data from tables 54, 56, 58 and 60 and places it in an integral buffer (not shown). The run-time code causes the data in the buffer to be compared to the logical combinations of null and non-null columns defined by the CLASSKEYMAP statement and a subclass to be determined. The run-time code then instantiates the proper subclass of class "DEmpAddr" and fluffs the instance variables in that dependent subclass with the data retrieved from the corresponding columns in the database.

Figure 7:
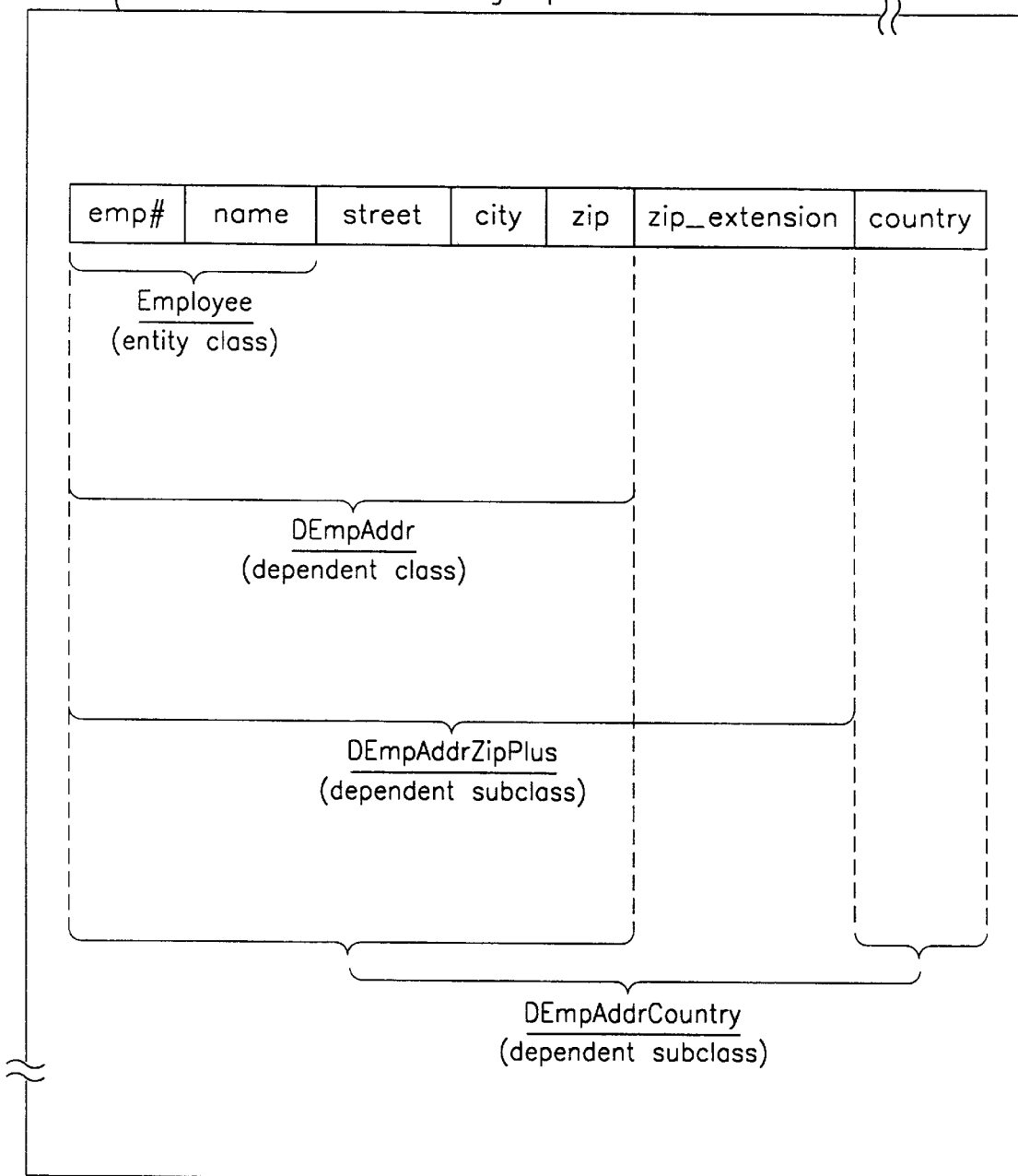
FIG. 7 illustrates an alternative mapping method in which dependent classes and subclasses are mapped to the same table as that to which the entity containing the dependent is mapped.

FIG. 7 illustrates an alternative mapping method that can be performed at run-time to determine whether dependent 12 (see FIG. 1) is of subclass 14, subclass 16 or neither. As in the method described above with respect to FIG. 4, a user generates the SML 24, either manually or using schema map tool 22, that defines the mapping. In accordance with this method, the data relating to classes and subclasses of the employee entity are stored in a single table "onebigemptable" 62. Table "onebigemptable" 62 stores the values of instance variables "emp#", "name", "street", "city", "zip", "zip_extension" and "country" in its columns. The following is a code listing of the SML 24 that defines this schema mapping:

```
CLASS Account.Employee
    PRIMARYKEY Account.DEmpKey
        PRIMARY_KEYFIELD Emp# String FIELD emp#
    END_PRIMARYKEY
    FIELD emp# String COLUMN onebigemptable.emp# CHAR(6) EXTERNAL
        NOTNULL
    FIELD name String COLUMN onebigemptable.name VARCHAR(20)
        EXTERNAL
    OBJECT emp_addr DEmpAddr
        CLASSKEYMAP (CLASSIS Account.DEmpAddr
            WHEN onebigemptable.zip_extension CHAR(9) EXTERNAL =
                NULL, onebigemptable.country VARCHAR(20) EXTERNAL
                = NULL)
        CLASSKEYMAP (CLASSIS Account.DEmpAddrZipPlus
            WHEN onebigemptable.zip_extension CHAR(9) EXTERNAL ^=
                NULL, onebigemptable.country VARCHAR(20) EXTERNAL
                = NULL)
        CLASSKEYMAP (CLASSIS Account.DEmpAddrCountry
            WHEN onebigemptable.zip_extension CHAR(9) EXTERNAL =
                NULL, onebigemptable.country VARCHAR(20) EXTERNAL
                ^= NULL)
        FIELD street String COLUMN onebigemptable.street VARCHAR(30)
            EXTERNAL
        FIELD city String COLUMN onebigemptable.city VARCHAR(15)
            EXTERNAL
        FIELD zip String COLUMN onebigemptable.zip VARCHAR(9)
            EXTERNAL
    SUBCLASS DEmpAddrZipPlus
        FIELD zip_extension String COLUMN onebigemptable.zip_extension
            CHAR(4) EXTERNAL
    END_SUBCLASS
    SUBCLASS DEmpAddrCountry
```

```
    FIELD country String COLUMN onebigemptable.country VARCHAR
        (20) EXTERNAL
    END_SUBCLASS
    END_OBJECT emp_addr
END_CLASS Account.Employee
```

The above-listed SML code is very similar to that described above with respect to FIGS. 3 and 6. The difference is that the table names have been replaced with a single table name. Accordingly, the "RELATIONSHIP" and "COLUMN" tags are not needed. In operation at run-time, the code causes essentially the same functions to occur. Nevertheless, there may be certain advantages to selecting one method over the other.

The method described above with respect to the example illustrated in FIGS. 3 and 6, in which the classes and subclasses of the object and its dependent are stored in separate tables, provides both advantages and disadvantages. On one hand, it facilitates subclassing flexibility. A programmer may create application programs that add new subclasses dynamically, i.e., at run-time, because the existing tables need not be modified. On the other hand, it increases the likelihood of a page fault. If the system attempts to retrieve data from a table that has not yet been retrieved from the data store into working memory (typically a cache memory), the system must retrieve the additional table from the data store. The system overhead incurred in transferring the additional data from a data store, which generally includes a disk drive or similar relatively slow mass storage device, degrades system performance.

The method described above with respect to the example illustrated in FIGS. 3 and 7, in which the classes and subclasses of the object and its dependent are stored in a single table, similarly provides both advantages and disadvantages. On one hand, it decreases the likelihood of a page fault because all of the data in the table are likely to have already been stored in cache memory. On the other hand, it inhibits subclassing flexibility because new subclasses cannot be defined dynamically.

Figure 8:
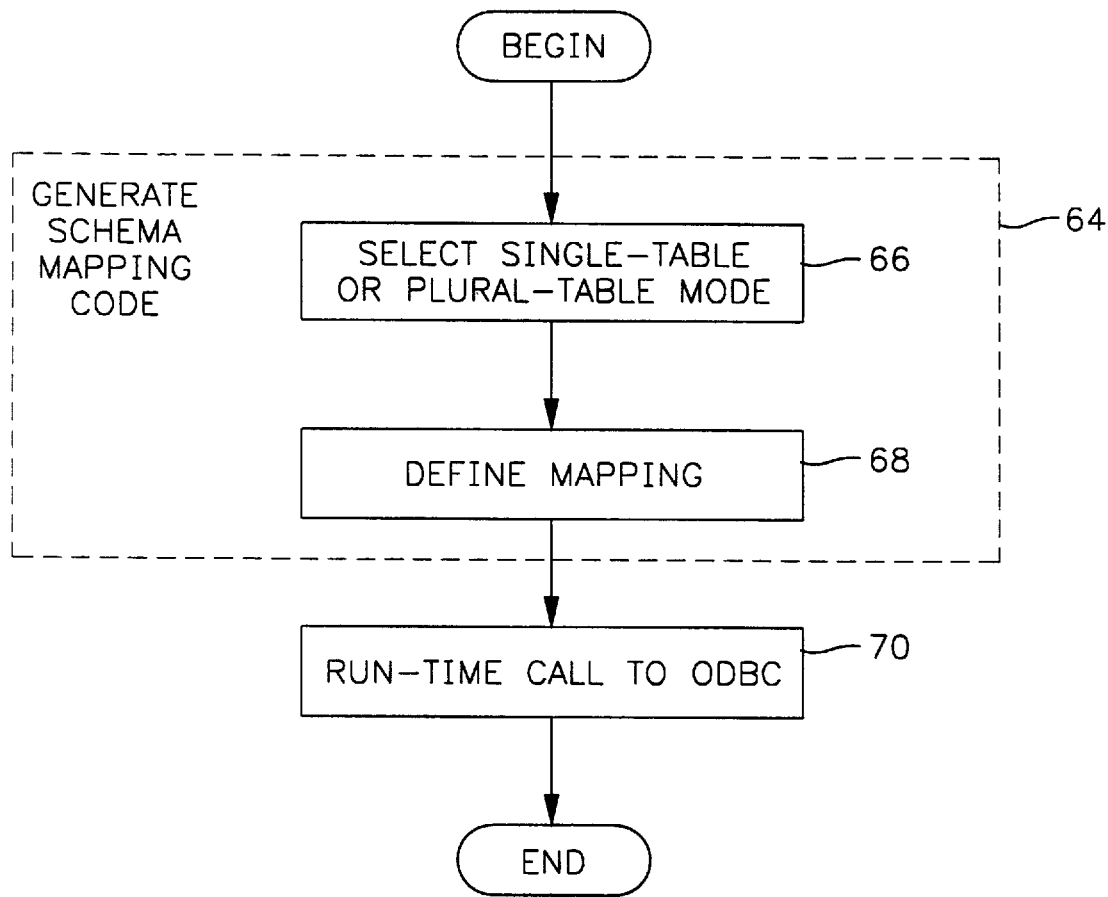
FIG. 8 is a flow diagram of a method of the present invention.

The flow diagram illustrated in FIG. 8 summarizes the above-described methods. Prior to the time the application program is executed, i.e., prior to run-time, at step 64 the user generates SML 24 (FIG. 4), either manually or with the aid of schema map tool 22. Step 64 includes the step 66 of selecting either the single-table mode, which is described above with respect to FIGS. 3 and 7, or the plural-table mode, which is described above with respect to FIGS. 3 and 6. Step 64 also includes the step 68 of defining a mapping. SML 24 and schema map object 27 (FIG. 4) represent the mapping. When the application program references a persistent object at run-time, a call to ODBC 28 is initiated at step 70.

As described above, aspects of the present invention pertain to a method and system embodied in a standalone, distributed, or other computer system. Nevertheless, the invention may alternative be embodied as a computer program product for use with a computer system. The programs defining the SML, run-time code and functions of the present invention can be delivered to a computer system via a variety of signal-bearing media, which may include both recordable-type media and transmission-type media. Examples of recordable-type media include, but are not limited to: (a) information permanently stored on non-writeable storage media (e.g., read-only memory devices within a computer, such as a read-only portion of memory 38 in FIG. 5); and (b) alterable information stored on writeable storage media (e.g., floppy disks within a media drive such as disk drive 53 in FIG. 5). Examples of transmission-type media include conventional computer networks such as network link 46 (FIG. 5), as well as telephone networks, cable television networks, satellite broadcast networks, other wireless communication systems, and combinations thereof. Therefore, it should be understood that such signal-bearing media, when carrying computer readable instructions that direct the method functions of the present invention, represent alternative embodiments of the present invention.

Other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A computer-implemented method for mapping a dependent between object-oriented schema and relational data store schema, said dependent having a dependent class and a plurality of dependent subclasses, said dependent classes and dependent subclasses having attributes represented by instance variables, said relational data store schema defined by a plurality of columns, each column corresponding to one of said attributes, the method comprising the steps of:

generating mapping software code in a high-level language, said mapping software code defining a mapping between each instance variable of said dependent class and one of said columns, said mapping software code further defining a mapping between each instance variable of each dependent subclass and one of said columns, said mapping software code mapping a marker to each column for which a dependent subclass has no corresponding attribute, each dependent class and dependent subclass thereby defined by a pattern of columns having said marker and columns not having said marker; and initiating an application program run-time call to an object database driver referencing an object, said object database driver accessing data elements of said data store and associating said data elements with instance variables of said object in response to said application program run-time call and said mapping software code.

2. The computer-implemented method recited in claim 1, wherein:

said columns include columns in a plurality of tables of said relational data store schema; and said mapping software code defines a connection between said columns of said tables corresponding to the same attribute as each other.

3. The computer-implemented method recited in claim 2, wherein said instance variables of each said dependent class and each said dependent subclass are mapped to a table different from said tables to which said instances variables of all other dependent classes and dependent subclasses are mapped.

4. The computer-implemented method recited in claim 1, wherein all of said columns are included within one table of said relational data store schema.

5. A computer-implemented method for selectively mapping a dependent between object-oriented schema and relational data store schema in accordance with a selected table mode, said dependent having a dependent class and a plurality of dependent subclasses, said dependent classes and dependent subclasses having attributes represented by instance variables, said relational data store schema defined by a plurality of columns, each column corresponding to one of said attributes, the method comprising the steps of:

selecting either a single-table mode or a plural-table mode;

generating mapping software code in a high-level language, said mapping software code defining a mapping between each instance variable of said dependent class and one of said columns, said mapping software code further defining a mapping between each instance variable of each dependent subclass and one of said columns, said mapping software code mapping a marker to each column for which a dependent subclass has no corresponding attribute, each dependent class and dependent subclass thereby defined by a pattern of columns having said marker and columns not having said marker;

said mapping software code, in response to selection of said plural-table mode, defines a mapping wherein said columns include columns in a plurality of tables of said relational data store schema, and said mapping software code defines a connection between said columns of said tables corresponding to the same attribute as each other; and said mapping software code, in response to selection of said single-table mode defines a mapping wherein all of said columns are included within one table of said relational data store schema.

6. A system for mapping a dependent between object-oriented schema and relational data store schema, said dependent having a dependent class and a plurality of dependent subclasses, said dependent classes and dependent subclasses having attributes represented by instance variables, said relational data store schema defined by a plurality of columns, each column corresponding to one of said attributes, comprising:

a mapping software code generator for generating mapping software code in a high-level language, said mapping software code defining a mapping between each instance variable of said dependent class and one of said columns, said mapping software code further defining a mapping between each instance variable of each dependent subclass and one of said columns, said mapping software code mapping a marker to each column for which a dependent subclass has no corresponding attribute, each dependent class and dependent subclass thereby defined by a combination of columns having said marker and columns not having said marker; and an object database driver, wherein an application program run-time call from an application program running on a computer references an object, and said object database driver accesses data elements of said data store and associates said data elements with instance variables of said object in response to said application program run-time call and said mapping software code.

7. The system recited in claim 6, wherein:

said columns include columns in a plurality of tables of said relational data store schema; and said mapping software code defines a connection between said columns of said tables corresponding to the same attribute as each other.

8. The system recited in claim 7, wherein said instance variables of each said dependent class and each said dependent subclass are mapped to a table different from said tables to which said instances variables of all other dependent classes and dependent subclasses are mapped.

9. The system recited in claim 6, wherein all of said columns are included within one table of said relational data store schema.

10. A program product for use in a computer system for mapping a dependent between object-oriented schema and relational data store schema, said dependent having a dependent class and a plurality of dependent subclasses, said dependent classes and dependent subclasses having attributes represented by instance variables, said relational data store schema defined by a plurality of columns, each column corresponding to one of said attributes, said computer program product comprising a signal-bearing medium carrying thereon:

mapping code defining a mapping between each instance variable of said dependent class and one of said columns, said mapping code further defining a mapping between each instance variable of each dependent subclass and one of said columns, said mapping code mapping a marker to each column for which a dependent subclass has no corresponding attribute, each dependent class and dependent subclass thereby defined by a pattern of columns having said marker and columns not having said marker; and a connection between said mapping code and an object class having said dependent class, whereby an application program run-time call from an application program running on a computer references an object, and said object database driver accesses data elements of said data store and associates said data elements with instance variables of said object in response to said application program run-time call and said mapping code.

11. The program product recited in claim 10, wherein:

said columns include columns in a plurality of tables of said relational data store schema; and said mapping code defines a connection between said columns of said tables corresponding to the same attribute as each other.

12. The program product recited in claim 11, wherein said instance variables of each said dependent class and each said dependent subclass are mapped to a table different from said tables to which said instances variables of all other dependent classes and dependent subclasses are mapped.

13. The program product recited in claim 10, wherein all of said columns are included within one table of said relational data store schema.

* * * * *